United States Patent
Wasserman et al.

(10) Patent No.: US 8,324,311 B2
(45) Date of Patent: Dec. 4, 2012

(54) METHOD FOR CROSSLINKING POLYOLEFINS WITH IN SITU GENERATED WATER

(75) Inventors: Eric P. Wasserman, Hopewell, NJ (US); Bharat I. Chaudhary, Princeton, NJ (US)

(73) Assignee: Dow Global Technologies LLC, Midland, MI (US)

( * ) Notice: Subject to any disclaimer, the term of this patent is extended or adjusted under 35 U.S.C. 154(b) by 363 days.

(21) Appl. No.: 12/667,759

(22) PCT Filed: Jul. 7, 2008

(86) PCT No.: PCT/US2008/069289
§ 371 (c)(1),
(2), (4) Date: Jan. 5, 2010

(87) PCT Pub. No.: WO2009/012069
PCT Pub. Date: Jan. 22, 2009

(65) Prior Publication Data
US 2011/0015335 A1    Jan. 20, 2011

(51) Int. Cl.
*C08L 41/00* (2006.01)
(52) U.S. Cl. ....... 524/547; 428/36.9; 524/284; 524/288; 524/300; 524/394; 525/194; 525/195; 525/209; 525/326.5; 525/360; 525/370; 525/386

(58) Field of Classification Search .......... 428/36.9; 524/521, 547, 284, 288, 300, 394; 525/194, 525/195, 209, 326.5, 360, 370, 386
See application file for complete search history.

(56) References Cited

U.S. PATENT DOCUMENTS

| | | | |
|---|---|---|---|
| 3,225,018 A | 12/1965 | Zutty | |
| 3,646,155 A | 2/1972 | George | |
| 4,310,640 A | 1/1982 | Kato et al. | |
| 4,574,133 A | 3/1986 | Umpleby | |
| 4,795,786 A * | 1/1989 | Umpleby | 525/326.5 |
| 4,975,480 A | 12/1990 | Bullen | |
| 5,047,476 A | 9/1991 | Keogh | |
| 6,331,597 B1 | 12/2001 | Drumright et al. | |
| 6,420,485 B1 | 7/2002 | Suzuki et al. | |

FOREIGN PATENT DOCUMENTS

| | | | |
|---|---|---|---|
| JP | 57-023650 | * | 2/1982 |
| JP | 57023650 | * | 2/1982 |
| WO | 2007/032885 A2 | | 3/2007 |

* cited by examiner

*Primary Examiner* — David W Wu
*Assistant Examiner* — Marie Reddick
(74) *Attorney, Agent, or Firm* — Whyte Hirschboeck Dudek SC

(57) ABSTRACT

Compositions comprising a polymer resin comprising at least one copolymer with hydrolysable groups, an amino acid or dicarboxylic acid water-generating organic compound, and a catalyst that comprises a metal atom and at least two ligands taken from the set alkyloxy and earhcxylate are used to form articles that moisture-cure through in-situ generation of water via ring-closing dehydration reactions.

18 Claims, 1 Drawing Sheet

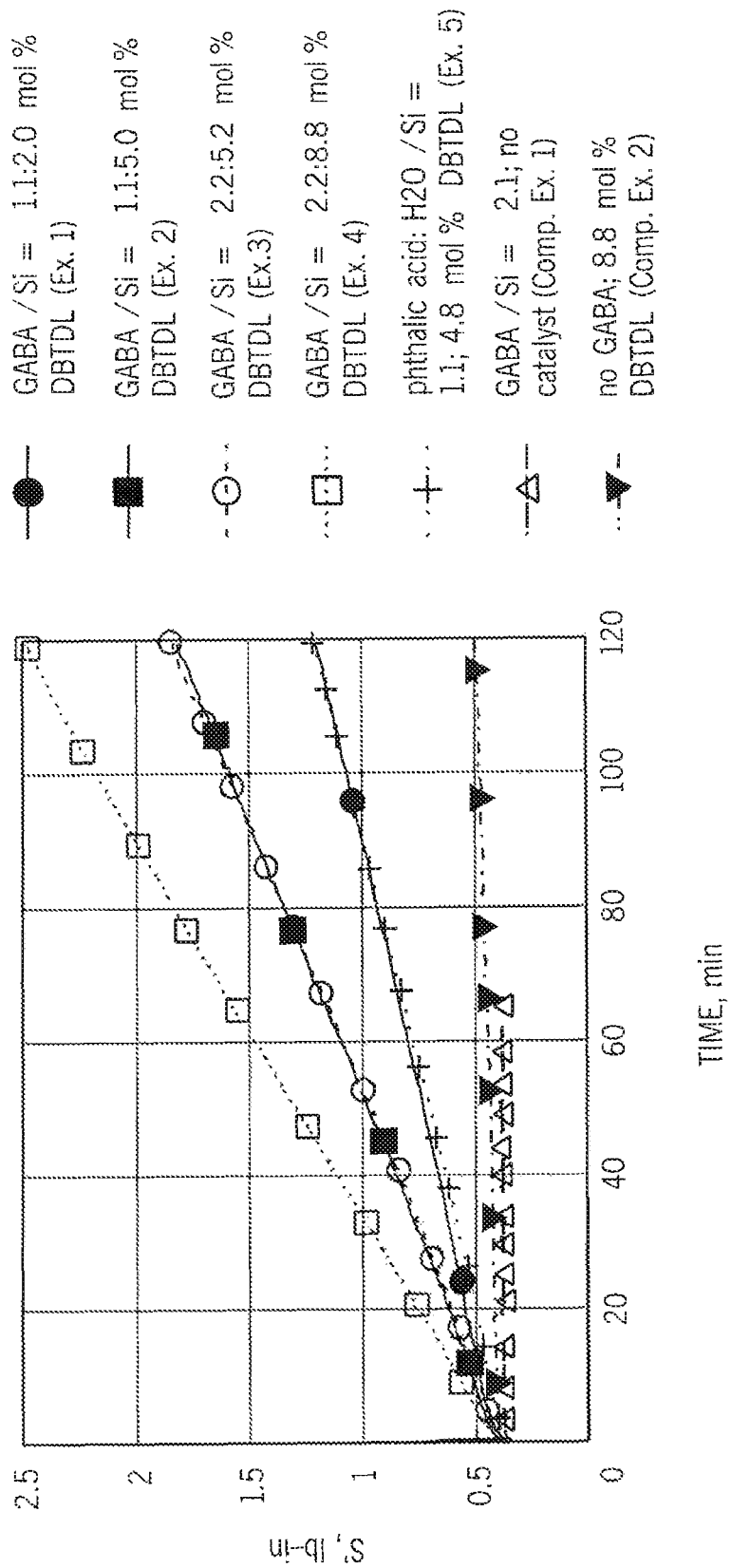

METHOD FOR CROSSLINKING POLYOLEFINS WITH IN SITU GENERATED WATER

FIELD OF THE INVENTION

This invention relates generally to moisture-cured resins and more specifically to compositions and methods for in-situ generation of water to effect the moisture cure.

BACKGROUND OF THE INVENTION

Moisture-cured resins represent a significant portion of the market for crosslinked polyolefins in cable insulation today. They are generally restricted to articles of thin construction because the crosslinking chemistry requires the polymer to absorb moisture from the environment at temperatures below the polymer's melting point, and diffusion of water through a semicrystalline, hydrophobic polymer is very slow. Direct addition of water prior to fabrication is impractical because (a) it boils at temperatures appropriate for the extrusion of polyethylenes; (b) its solubility in polyolefins is extremely low; and (c) water trapped in the polymer above the saturation point is likely to phase separate, causing defects due to voids and highly nonuniform crosslink densities. Also, large amounts of free water might cause premature crosslinking. What is needed is a method of generating water over time in a polyolefinic article but without causing premature crosslinking during the extrusion of the article.

BRIEF SUMMARY OF THE INVENTION

In one embodiment, the invention is a composition comprising a polymer resin comprising at least one copolymer with hydrolysable groups, an amino acid, auric acid, or dicarboxylic acid water-generating organic compound, and a catalyst that comprises a metal atom and at least two ligands taken from the set alkyloxy and carboxylate.

In another embodiment, the invention is composition comprising a polymer resin comprising at least one copolymer with hydrolysable groups, a water-generating organic compound that is at least one of an amino acid of Formula (1) or a dicarboxylic acid of Formula (2) or an amic acid of Formula (3):

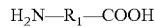  (1)

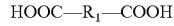  (2)

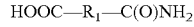  (3)

wherein $R_1$ is a hydrocarbon diradical with at least two carbon atoms lying between the two end substituents, and a catalyst that comprises a metal atom and at least two ligands taken from the set alkyloxy and carboxylate.

In still another embodiment, the invention is a process for forming a moisture-cured article, the process comprising forming a composition comprising a polymer resin comprising at least one copolymer with hydrolysable groups, an amino acid or dicarboxylic acid or amic acid water-generating organic compound, and a catalyst that comprises a metal atom and at least two ligands taken from the set alkyloxy and carboxylate into an article and allowing the composition to cure.

BRIEF DESCRIPTION OF THE FIGURES

FIG. 1 is a graph showing torque versus cure time profiles for various examples and comparative examples.

DETAILED DESCRIPTION OF THE INVENTION

The composition of this invention comprises at least one copolymer with hydrolysable groups, an amino acid or dicarboxylic acid or amic acid water-generating organic compound, and a catalyst.

By adding certain organic molecules to moisture-curable polymer, water can be generated by ring-closing dehydration reactions over a long enough period of time to allow shaping of the molten polymer without unacceptably high crosslinking densities. Such reactions include the ring closing of amino acids to lactams, the ring closing of amic acids to cyclic imides, and the ring closing of diacids to cyclic anhydrides. Surprisingly, we find that the catalysts normally chosen to accelerate the hydrocondensation of trimethoxysilyl groups (introduced into the polyolefin through direct copolymerization or grafting for the purpose of providing sites for moisture-induced crosslinking) also catalyze the ring-closing reactions that generate water. Thus the rate of water generation and its dependence upon temperature can be modulated through the choice of catalyst, catalyst level, and water generating compound. Also, the extent of crosslinking can be regulated through the silane content of the resin and the level of water generating compound. Another benefit of this invention is provided by the fact that the products of the water generating reactions described above, namely lactams or anhydrides, are non-ionic materials, unlike inorganic sources of moisture such as salt hydrates. Therefore one would expect them to be far less likely to cause electrical problems associated with breakdown due to charge concentration or dilectric loss.

Any copolymer with hydrolysable groups that is to be cured in the melt or solid state and is thicker than about 2 mm would benefit from a cure technology such as this. The majority of the polymer need not be derived from ethylene or any other olefin, but could derive from cyclic esters or ethers, for example. The technology could also be useful in the fabrication of polymer foams, films, fibers, footwear, pipes, etc.

The copolymer with hydrolysable groups is most typically a silane functional copolymer. Polymers with silane functional groups are well-known in the field. Such polymers can be made either by copolymerization of a suitable base monomer with a reactive silane compound or by one of many methods for grafting a silane-containing molecule to the backbone of a polymer chain. Typical suitable base monomers (or monomers for producing the polymer chain backbone) include, for example, one or more of styrene, ethylene, propylene, methyl methacrylate, or vinyl acetate, more typically ethylene. The reactive silane compound can be an unsaturated silane compound having one or more hydrolyzable groups. Typical reactive silane compounds include an alkenyl group such as vinyl, allyl, isopropenyl, butenyl, cyclohexenyl, or γ-(meth)acryloxy allyl, and a hydrolyzable group such as a hydrocarbyloxy, hydrocarbonyloxy or hydrocarbylamino group. Specific examples of hydrolyzable groups include methoxy, ethoxy, formyloxy, acetoxy, propionyloxy, and alkylamino or acrylamino groups. More typically, the reactive silane compound is a vinyltrialkoxysilane. A suitable reactive silane is vinyl trimethoxysilane. Examples of methods to produce polymers with silane functional groups are disclosed in U.S. Pat. Nos. 3,646,155; 6,420,485; 6,331,597; 3,225,018; and 4,574,133, all of which are incorporated herein by reference. Polymers with silane functional groups are also commercially available, for example, SI-LINK™ ethylene-vinyltrimethoxysilane copolymers available from Dow Chemical Co.

In one embodiment, the copolymer with hydrolysable groups is a copolymer of ethylene and a vinyltrialkoxysilane (wherein the alkoxy group is $R_2O$, in which $R_2$ is an alkyl group of 1-8 carbon atoms), produced either through copolymerization or through radical grafting. An example of a suitable such polymer is an ethylene-vinyltrimethoxysilane copolymer. The vinylalkoxysilane content should be between about 0.1 and about 5 mole % relative to all monomers.

Amino acids, amic acids, and dicarboxylic acids that can form a ring structure through a condensation mechanism are suitable for the water-generating compound. Typically, the water-generating organic compound is at least one of an amino acid of Formula (1) or a dicarboxylic acid of Formula (2) or an amic acid of Formula (3):

$$H_2N\text{—}R_1\text{—}COOH \quad (1)$$

$$HOOC\text{—}R_1\text{—}COOH \quad (2)$$

$$HOOC\text{—}R_1\text{—}C(O)NH_2 \quad (3)$$

wherein $R_1$ is a hydrocarbon diradical with at least two carbon atoms lying between the two end substituents. Examples of suitable water-generating organic compounds include γ-aminobutyric acid (GABA), phthalic acid, phthalamic acid, and succinamic acid. The water-generating compound should be present in an amount sufficient to provide between about 0.05 to about 4 moles of water per mole of silane substituent.

The moisture-cure catalyst can be any compound that promotes both the silane condensation crosslinking reaction and the ring-closing reactions that generate water. Generally, such a catalyst comprises a metal atom and at least 2 ligands taken from the set alkyloxy and carboxylate. Surprisingly, we find that the catalysts normally chosen to accelerate the hydrocondensation of trimethoxysilyl groups (introduced into the polyolefin through direct copolymerization or grafting for the purpose of providing sites for moisture-induced crosslinking) also catalyze the ring-closing reactions that generate water. Such typical moisture-cure catalysts are well-known in the art and include, for example, organic bases, carboxylic acids, and organometallic compounds. Generally, suitable catalysts fall into one of the following families of compounds:

$$R_2Sn(O_2C\text{—}R')_2, \text{ in which R, R' are alkyl or aryl groups.} \quad [4]$$

$$R_2Sn(OR')(OR'') \text{ in which R, R' are alkyl groups and R'' can be an alkyl group or hydrogen atom;} \quad [5]$$

$$R_2(R'O)Sn\text{—}O\text{—}Sn(OR')R_2 \text{ in which R is an alkyl group and R' is an alkyl or carboxyl (R—C=O) group or hydrogen atom.} \quad [6]$$

Most typically, the moisture-cure catalyst is one or more organometallic compounds or complexes of lead, cobalt, iron, nickel, zinc, titanium, aluminum, or tin, preferably tin, such as dibutyltin dilaurate or distannoxanes. Specific catalysts include, for example, dibutyltin dilaurate, dioctyltin maleate, dibutyltin diacetate, dibutyltin dioctoate, dibutyltin didodecanoate, stannous acetate, stannous octoate, lead naphthenate, zinc caprylate, titanium alkoxides, aluminum alkoxides, and cobalt naphthenate. Such catalysts are commercially available. The catalyst should be present in concentrations of between about 0.1 and about 20 mole % relative to the silane substitutent.

The components are to be mixed at a temperature and for a length of time sufficient to fully homogenize the mixture but insufficient to cause the material to gel. The catalyst may be added before or after the water-generating compound. Typically, the components are mixed together in a melt-mixing device. The mixture is then shaped into the final article. The temperature of compounding and article fabrication should be above the melting point of the polymer but below about 250° C.

In some embodiments, either or both of the catalyst or the moisture-forming compound are added as a pre-mixed masterbatch. Such masterbatches are commonly formed by dispersing the compound into an inert plastic resin, such as low density polyethylene. Masterbatches are conveniently formed by melt compounding methods.

The formed article is then subjected to a cure period, which takes place at temperatures below the melting point of the polymer, until the article has reached the desired degree of crosslinking. Generally, the cure may take place at ambient or elevated temperature but the temperature of the cure should be above 0° C.

In some embodiments, the composition may further contain non-moisture curable polymer resins. Such resins may be incorporated as carriers for the catalyst and/or the moisture-forming compound (e.g., the masterbatch methods), as diluents, as reactants in other crosslinking reactions (e.g., free-radical crosslinking), or to provide specific physical properties to the composition (e.g., adding an elastomeric resin to provide elasticity or impact resistance). These non-moisture curable resins should be added in an amount that does not reduce the strength of the cured composition to an undesirable extent. Although the upper limit is application specific, one skilled in the art is experienced in determining such cut-off points. Generally, the amount of these resins would be less than about 40%.

The composition can contain other flame retardants and fillers including talc, calcium carbonate, organoclay, glass fibers, marble dust, cement dust, feldspar, silica or glass, fumed silica, silicates, alumina, various phosphorus compounds, ammonium bromide, antimony trioxide, antimony trioxide, zinc oxide, zinc borate, barium sulfate, silicones, aluminum silicate, calcium silicate, titanium oxides, glass microspheres, chalk, mica, clays, wollastonite, ammonium octamolybdate, intumescent compounds, expandable graphite, and mixtures thereof. The fillers may contain various surface coatings or treatments, such as silanes, fatty acids, and the like. Halogenated organic compounds including halogenated hydrocarbons such as chlorinated paraffin, halogenated aromatic compounds such as pentabromotoluene, decabromodiphenyl oxide, decabromodiphenyl ethane, ethylene-bis(tetrabromophthalimide), dechlorane plus, and other halogen-containing flame retardants. One skilled in the art would recognize and select the appropriate halogen agent depending on the desired performance of the composition. The composition can further comprise various other additives. Peroxides and free-radical initiators can be added for crosslinking the resin.

The composition can contain other additives such as, for example, antioxidants (e.g., hindered phenols such as, for example, IRGANOX™ 1010 a registered trademark of CibaSpecialty Chemicals), phosphites (e.g., IRGAFOS™ 168 a registered trademark of CibaSpecialty Chemicals), U.V. stabilizers, cling additives, light stabilizers (such as hindered amines), plasticizers (such as dioctylphthalate or epoxidized soy bean oil), thermal stabilizers, mold release agents, tackifiers (such as hydrocarbon tackifiers), waxes (such as polyethylene waxes), processing aids (such as oils, organic acids such as stearic acid, metal salts of organic acids), crosslinking agents (such as peroxides or silanes), colorants or pigments to the extent that they do not interfere with desired physical or mechanical properties of the compositions of the present invention, and other flame retardant additives. The above additives are employed in functionally equivalent amounts known to those skilled in the art, generally in amounts of up to about 65 percent by weight, based upon the total weight of the composition.

EXAMPLES

Example 1

A pelletized sample of a copolymer of ethylene and vinyltrimethoxysilane (VTMS) (41.3 g) containing 1.5 wt % VTMS was added to a twin-screw mixer with setpoint of 128° C. and 25 RPM, followed 4 minutes later by 0.454 g γ-aminobutyric acid (GABA) and 10 minutes after that, by 0.052 g dibutyltin dilaurate (DBTDL). During the mixing process, the temperature ranged from 120-125° C. After a further 4 minutes, the mixer was stopped and the compounded material was removed from the mixer and allowed to solidify. A sample (4-6 g) of the composition was compressed into a disk between two sheets of non-interacting film and analyzed by oscillating rheometry at 100 RPM and 0.5° excursion at 140° C. The torque exhibited by this sample was 0.45 lb-in after 5 minutes and 0.81 lb-in after 62 minutes.

Example 2

A sample of the same copolymer from Ex. 1 (41.3 g) was added to a twin-screw mixer with settings as in Ex. 1, followed 1 minute later by 0.471 g GABA and, 3 minutes after that, by 0.133 g DBTDL. During the mixing process, the temperature ranged from 118-123° C. After a further 5 minutes, the material was removed from the mixer and allowed to solidify. A sample (4-6 g) was compressed into a disk between two sheets of non-interacting film and analyzed by oscillating rheometry at 100 RPM and 0.5° excursion at 140° C. The torque exhibited by this sample was 0.47 lb-in after 5 minutes and 1.09 lb-in after 60 minutes.

Example 3

A sample of the same copolymer from Ex. 1 (41.5 g) was added to a twin-screw mixer with settings as in Ex. 1, followed 1 minute later by 0.935 g GABA and 2 minutes after that, by 0.133 g DBTDL. During the mixing process, the temperature ranged from 120-123° C. After 5 minutes, the material was removed from the mixer and allowed to solidify. A sample (4-6 g) was compressed into a disk between two sheets of non-interacting film and analyzed by oscillating rheometry at 100 RPM and 0.5° excursion at 140° C. The torque exhibited by this sample was 0.45 lb-in after 5 minutes and 1.10 lb-in after 62 minutes.

Example 4

A sample of the same copolymer from Ex. 1 (40.6 g) was added to a twin-screw mixer with settings as in Ex. 1, followed 3 minutes later by 0.918 g GABA and 3 minutes after that, by 0.228 g DBTDL. During the mixing process, the temperature ranged from 118-123° C. After 10 minutes, the material was removed from the mixer and allowed to solidify. A sample (4-6 g) was compressed into a disk between two sheets of non-interacting film and analyzed by oscillating rheometry at 100 RPM and 0.5° excursion at 140° C. The torque exhibited by this sample was 0.50 lb-in after 5 minutes and 1.50 lb-in. after 62 minutes.

Example 5

A sample of the same copolymer from Ex. 1 (41.6 g) was added to a twin-screw mixer with settings as in Ex. 1, followed 7 minutes later by 0.794 g phthalic acid and 3 minutes after that, by 0.128 g DBTDL. During the mixing process, the temperature was maintained at 122° C. After 5 minutes, the material was removed from the mixer and allowed to solidify. A sample (4-6 g) was compressed into a disk between two sheets of non-interacting film and analyzed by oscillating rheometry at 100 RPM and 0.5° excursion at 140° C. The torque exhibited by this sample was 0.42 lb-in. after 5 minutes and 0.79 lb-in. after 62 minutes

Comparative Example 1

Exclusion of Catalyst

A sample of the same copolymer from Ex. 1 (41.3 g) was added to a twin-screw mixer with settings as in Ex. 1, followed 3 minutes later by 0.919 g GABA. During the mixing process, the temperature ranged from 112-123° C. After 5 minutes, the material was removed from the mixer and allowed to solidify. A sample (4-6 g) was compressed into a disk between two sheets of non-interacting film and analyzed by oscillating rheometry at 100 RPM and 0.5° excursion at 140° C. The torque exhibited by this sample was 0.38 lb-in. after 5 minutes and 0.38 lb-in. after 62 minutes

Comparative Example 2

Exclusion of Water-Generating Compound

A sample of the same copolymer from Ex. 1 (41.5 g) was added to a twin-screw mixer with settings as in Ex. 1, followed 3 minutes later by 0.233 g DBTDL. During the mixing process, the temperature ranged from 116-123° C. After 6 minutes, the material was removed from the mixer and allowed to solidify. A sample (4-6 g) was compressed into a disk between two sheets of non-interacting film and analyzed by oscillating rheometry at 100 RPM and 0.5° excursion at 140° C. The torque exhibited by this sample was 0.40 lb-in. after 5 minutes and 0.45 lb-in. after 62 minutes The torque versus time profiles for all of the Examples and Comparative Examples are shown in FIG. 1.

These examples indicate that a combination of vinyltrimethoxysilane copolymer, an amino acid or phthalic acid, and an organometallic catalyst induce significant crosslinking at 140° C. Comparing Ex. 1 with Ex. 2 and Ex. 3 with Ex. 4 shows that the one-hour torque value increases in response to an increase in the amount of catalyst present. Comparing Ex. 2 with Ex. 3 shows that, at a constant catalyst level, the one-hour torque is relatively insensitive to increases in the amount of GABA present. Comparing Ex. 5 to Ex. 2 shows that, at approximately equal molar concentrations, GABA provides a higher one-hour torque value than phthalic acid.

What is claimed is:
1. A composition comprising:
 (A) A polymer resin comprising at least one copolymer with hydrolysable groups,
 (B) An amino acid or amic acid water-generating organic compound, and
 (C) A catalyst that comprises a metal atom and two or more ligands selected from the group consisting of alkyloxy and carboxylate and combinations thereof.
2. The composition of claim 1 wherein the hydrolysable groups are silane functional groups.
3. The composition of claim 1 wherein the copolymer is the polymerization product of a vinyltrialkoxysilane and at least one other monomer.

4. The composition of claim 3 wherein the other monomer is selected from the group consisting of styrene, ethylene, propylene, methyl methacrylate, vinyl acetate and combinations thereof.

5. The composition of claim 3 wherein vinyltrialkoxysilane is present in an amount between about 0.1 and about 5 mole % relative to all monomers.

6. The composition of claim 1 wherein the copolymer is a copolymer of ethylene and vinyltrimethoxysilane.

7. The composition of claim 1 wherein the water-generating organic compound is at least one of an amino acid of Formula (1) or an amic acid of Formula (2):

$$H_2N-R_1-COOH \quad (1)$$

$$HOOC-R_1-C(O)NH_2 \quad (2)$$

wherein $R_1$ is a hydrocarbon diradical with at least two carbon atoms positioned between the two end substituents.

8. The composition of claim 7 wherein the amino acid is γ-aminobutyric acid.

9. The composition of claim 7 wherein the auric acid is phthalamic acid.

10. The composition of claim 1 wherein the catalyst is a dibutyltin dilaurate or a distannoxane.

11. The composition of claim 1 wherein the catalyst is dibutyltin dilaurate.

12. The composition of claim 1 wherein the water-generating organic compound is present in an amount sufficient to provide between about 0.1 and about 4 moles of water per mole of hydrolysable groups.

13. The composition of claim 1 wherein the catalyst is present in an amount between about 0.1 and about 20 mole % based on the moles of hydrolysable groups.

14. An article comprising the composition of claim 1 and at least one selected from the group consisting of flame retardants, fillers, antioxidants, phosphites, UV stabilizers, cling additives, light stabilizers, thermal stabilizers, mold release agents, tackifiers, waxes, processing aids, crosslinking agents, colorants and pigments.

15. The article of claim 14 wherein the article is a foam, film, fiber, footwear, pipe, cable, or wire.

16. A process for forming a moisture-cured article, the process comprising forming the composition of claim 1 into an article and allowing the composition to cure.

17. The process of claim 16 wherein the cure is done at a temperature below the melting point of the copolymer.

18. The process of claim 16 wherein the cure is conducted at ambient temperatures.

* * * * *